(12) United States Patent
Fuhse et al.

(10) Patent No.: US 11,034,182 B2
(45) Date of Patent: Jun. 15, 2021

(54) DISC-SHAPED PIGMENT, PRINTING INK, SECURITY ELEMENT AND METHOD OF PRODUCTION

(71) Applicant: GIESECKE+DEVRIENT CURRENCY TECHNOLOGY GMBH, München (DE)

(72) Inventors: Christian Fuhse, Otterfing (DE); Michael Rahm, Bad Tölz (DE); Manfred Heim, Bad Tölz (DE); Patrick Renner, Reichersbeuern (DE); Peter Schiffmann, Munich (DE); Christoph Mengel, Holzkirchen (DE)

(73) Assignee: GIESECKE+DEVRIENT CURRENCY TECHNOLOGY GMBH, Munich (DE)

( * ) Notice: Subject to any disclaimer, the term of this patent is extended or adjusted under 35 U.S.C. 154(b) by 0 days.

(21) Appl. No.: 16/644,302

(22) PCT Filed: Sep. 19, 2018

(86) PCT No.: PCT/EP2018/000438
§ 371 (c)(1),
(2) Date: Mar. 4, 2020

(87) PCT Pub. No.: WO2019/057327
PCT Pub. Date: Mar. 28, 2019

(65) Prior Publication Data
US 2021/0060996 A1 Mar. 4, 2021

(30) Foreign Application Priority Data

Sep. 22, 2017 (DE) ..................... 10 2017 008 918.3

(51) Int. Cl.
*B42D 25/378* (2014.01)
*B42D 25/324* (2014.01)
(Continued)

(52) U.S. Cl.
CPC ......... *B42D 25/378* (2014.10); *B42D 25/324* (2014.10); *B42D 25/369* (2014.10);
(Continued)

(58) Field of Classification Search
CPC .. B42D 25/378; B42D 25/373; B42D 25/369; B42D 25/425; B42D 25/324;
(Continued)

(56) References Cited

U.S. PATENT DOCUMENTS 5,912,767 A 6/1999 Lee
6,068,691 A 5/2000 Miekka et al.
(Continued)

FOREIGN PATENT DOCUMENTS

DE 102004003984 A1 8/2005
DE 102006012732 A1 9/2007
(Continued)

OTHER PUBLICATIONS

International Search Report and Written Opinion of International Application No. PCT/EP2018/000438, dated Dec. 20, 2018.

*Primary Examiner* — Justin V Lewis
(74) *Attorney, Agent, or Firm* — Workman Nydegger

(57) ABSTRACT

A platelet-shaped pigment with a layer construction comprises the following layers in the order, optionally a carrier substrate; a transparent embossing lacquer layer with an embossed relief structure; a reflection-increasing coating which follows the relief structure and forms a reflecting microstructure, wherein the reflecting microstructure is present in the form of a mosaic of a multiplicity of reflecting mosaic elements and the reflecting mosaic elements do not reflect the incident light in the direction of the specular reflex, regarding the plane of the platelet, but in a spatial direction deviating therefrom and respectively have a lateral dimension 1 greater than 2 μm.

13 Claims, 6 Drawing Sheets

(i)

(ii)

(51) Int. Cl.

| | |
|---|---|
| *B42D 25/369* | (2014.01) |
| *B42D 25/373* | (2014.01) |
| *B42D 25/425* | (2014.01) |
| *C09D 7/40* | (2018.01) |
| *C09D 5/36* | (2006.01) |
| *C09D 11/037* | (2014.01) |
| *C09D 11/101* | (2014.01) |
| *C09D 11/50* | (2014.01) |
| *B42D 25/29* | (2014.01) |

(52) U.S. Cl.
CPC ......... *B42D 25/373* (2014.10); *B42D 25/425* (2014.10); *C09D 5/36* (2013.01); *C09D 7/70* (2018.01); *C09D 11/037* (2013.01); *C09D 11/101* (2013.01); *C09D 11/50* (2013.01); *B42D 25/29* (2014.10)

(58) Field of Classification Search
CPC ........ B42D 25/29; C09D 11/101; C09D 7/70; C09D 5/36; C09D 11/037; C09D 11/50
USPC .... 283/67, 70, 72, 91, 94, 98, 109, 110, 901
See application file for complete search history.

(56) References Cited

U.S. PATENT DOCUMENTS

| | | | |
|---|---|---|---|
| 6,168,100 B1 | 1/2001 | Kato et al. | |
| 6,242,510 B1 | 6/2001 | Killey | |
| 2006/0014017 A1 | 1/2006 | Pilotek et al. | |
| 2006/0263539 A1* | 11/2006 | Argoitia | H01F 1/06 427/547 |
| 2007/0109532 A1 | 5/2007 | Dichtl | |
| 2008/0258456 A1 | 10/2008 | Rahm et al. | |
| 2012/0319395 A1 | 12/2012 | Fuhse et al. | |
| 2015/0367669 A1* | 12/2015 | Ruhland-Bauer | B42D 25/29 283/94 |

FOREIGN PATENT DOCUMENTS

| | | |
|---|---|---|
| DE | 102007009646 A1 | 8/2008 |
| DE | 102015006793 A1 | 12/2016 |
| EP | 0643745 A1 | 3/1995 |
| EP | 0952009 A2 | 10/1999 |
| EP | 1560884 B1 | 6/2006 |
| EP | 1760118 A2 | 3/2007 |
| EP | 1806238 A2 | 7/2007 |
| WO | 2004044059 A1 | 5/2004 |
| WO | 2005017048 A2 | 2/2005 |
| WO | 2007079851 A1 | 7/2007 |
| WO | 2009010377 A2 | 1/2009 |
| WO | 2011066991 A2 | 6/2011 |
| WO | 2016188619 A1 | 12/2016 |

\* cited by examiner (i)   (ii)

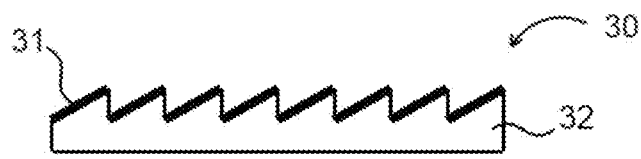
FIG. 7(a)
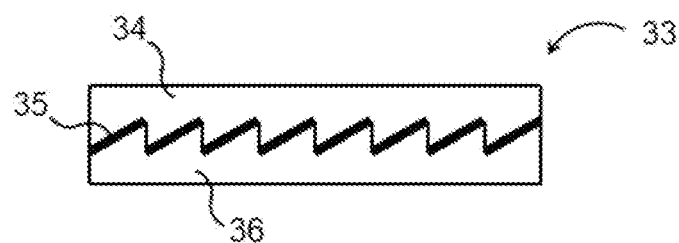
FIG. 7(b)
FIG 8
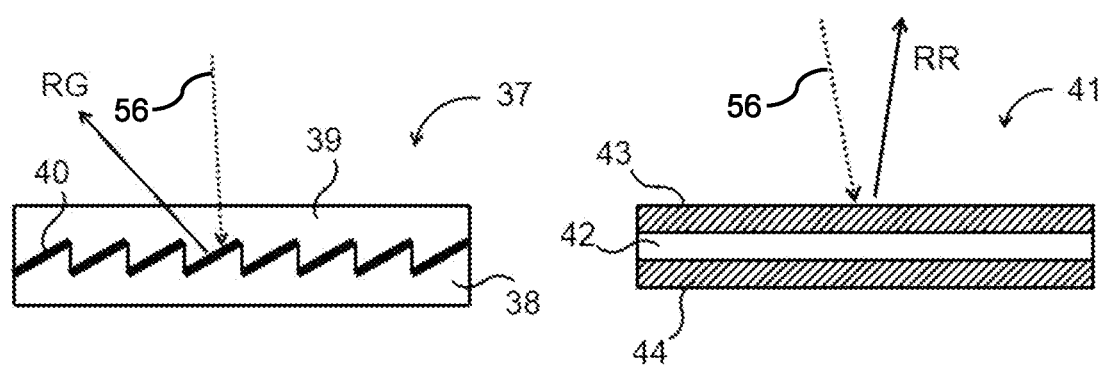
FIG 9
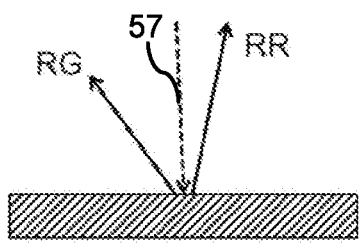

DISC-SHAPED PIGMENT, PRINTING INK, SECURITY ELEMENT AND METHOD OF PRODUCTION

BACKGROUND

The invention relates to a platelet-shaped pigment, a method for manufacturing the same, a printing ink containing the platelet-shaped pigment and a security element based on the platelet-shaped pigment according to the invention.

From the prior art there are known e.g. screen-printing inks having a color change effect. In the field of bank-note manufacture, e.g. optically variable inks (OVI) have been employed for many years, in which platelet-shaped pigments are coated on both sides with an interferential layer construction. The interferential layer construction, in particular a three-layer reflector/dielectric/absorber construction, gives the observer a different color impression in dependence on the viewing angle. Such interferential layer constructions are mostly manufactured by vacuum evaporation, which is technically demanding and cost-intensive. Usually, such color change effects cannot be carried out with arbitrary colors. When tilting the object to be viewed, starting out from the perpendicular viewing angle situation, the reflection spectrum shifts into the short-wavelength region, so that e.g. starting out from the reddish wavelength region a color change via the yellow wavelength region into the green wavelength region may occur, but not vice versa. Further, it is hardly possible to carry out a tilting of the color change effect towards a resulting colorless or white appearance.

Further, first order interference pigments are known, which are based on natural mica or on aluminium oxide flakes, borosilicate flakes or silicon dioxide flakes and are coated wet-chemically with titanium dioxide and/or metal oxide. Printing inks based on interference pigments which only have a titanium dioxide coating are transparent and are virtually unrecognizable in the form of a print on white backgrounds, while the interference color is visible at the tilt angle. The interference color is dependent on the titanium dioxide coating. In dependence on the thickness, the color tone changes from yellow via red to blue. Such pigments are offered e.g. by Merck under the brand name Iriodin.

Interference pigments with an iron oxide coating, however, are visually visible and show, depending on the coating thickness, already in the plan view on a white background a bronze or red color impression.

EP 1 560 884 B1 describes the manufacturing of diffractive pigments.

WO 2005/017048 A2 describes pigment flakes which may be provided with an embossing in the form of a grating.

EP 1 760 118 A2 describes how diffractive pigments can be aligned in a magnetic or electric field. In a further development according to EP 1 806 238 B1, with the aid of these pigments there can also be produced metameric features or tilt images.

A further manufacturing method for pigments having an embossing is described in WO 2009/010377 A2.

SUMMARY

Starting out from the above-cited prior art, the invention is based on the object of providing improved pigments and pigment inks with which the problems of too high costs and the previously usual limitations with regard to the color range can be overcome.

The invention is particularly applicable, but not limited, to the usage of pigments as a security feature in the field of value documents. Thus, the color-shifting coatings according to the invention can be employed alternatively and/or additionally for decorative purposes, e.g. as a printed decorative element on printed products or as a color-shifting lacquering in the field of automobiles, smartphones or the like.

SUMMARY OF THE INVENTION 1. (First aspect of the invention) Platelet-shaped pigment with a layer construction which has the following layers in the order:

optionally a carrier substrate;

a transparent embossing lacquer layer with an embossed relief structure;

a reflection-increasing coating which follows the relief structure and forms a reflecting microstructure, the reflecting microstructure being present in the form of a mosaic of a multiplicity of reflecting mosaic elements and the reflecting mosaic elements not reflecting the incident light in the direction of the specular reflex, with respect to the plane of the platelet, but in a spatial direction deviating therefrom and respectively having a lateral dimension 1 greater than 2 µm.

The pigment dimension or pigment width is preferably 2 times to 4 times, more preferably 2.5 times to 3.5 times, particularly preferably 3 times, larger than the lateral dimension 1 of the reflecting mosaic elements.

Further, it is preferred that the lateral dimension 1 of the reflecting mosaic elements respectively satisfies the following relation 2 µm<1<25 µm, particularly preferably the following relation 2 µm<1<20 µm.

According to a preferred variant, the reflecting microstructure in the form of a mosaic of a multiplicity of reflecting mosaic elements is constituted such that the reflecting mosaic elements reflect the incident light with respect to the plane of the platelet not in the direction of the specular reflex, but in exactly one spatial direction deviating therefrom.

According to another preferred variant, the reflecting microstructure in the form of a mosaic of a multiplicity of reflecting mosaic elements is constituted such that the reflecting mosaic elements reflect the incident light with respect to the plane of the platelet not in the direction of the specular reflex but in a plurality of different spatial directions or spatial regions deviating therefrom. The plurality of different spatial directions or spatial regions may be in particular the number 2, 3, 4, 5 or 6.

The reflection-increasing coating can in particular be a continuous or a discontinuous, i.e. interrupted, coating. A continuous (or full-area), reflection-increasing coating is preferred in view of the easier manufacturing, e.g. by full-area vapor deposition of a metallization. A discontinuous coating can be obtained e.g. by oblique vapor deposition of a metallization.

2. (Preferred configuration) Platelet-shaped pigment according to section 1, where the lateral dimension 1 satisfies the following relation 4 µm<1<25 µm, more preferably the relation 4 µm<1<20 µm, even more preferably the relation 4 µm<1≤10 µm, and particularly preferably the relation 6 µm≤1≤10 µm.

3. (Preferred configuration) Platelet-shaped pigment according to section 1 or 2, where the reflecting microstructure consists of basic elements selected from the group consisting of sawteeth or wedges, cones, truncated cones, pyramids and truncated pyramids.

In particular in the case where the basic element of the reflecting microstructure is a wedge or sawtooth, the basic element of the reflecting microstructure is equivalent with the reflecting mosaic element of the reflecting microstructure. In particular in the case where the basic element of the reflecting microstructure is an element selected from the group consisting of cones, truncated cones, pyramids and truncated pyramids, the basic element includes two mosaic elements.

4. (Preferred configuration) Platelet-shaped pigment according to any of sections 1 to 3, where the reflection-increasing coating is a metallization which, where applicable, is covered by a glazing ink layer.

5. (Preferred configuration) Platelet-shaped pigment according to section 4, where the reflection-increasing coating is a metallization which is covered by a glazing ink layer and the embossing lacquer layer is dyed in a color tone which is identical to the color tone of the glazing ink layer.

6. (Preferred configuration) Platelet-shaped pigment according to section 4, where (a) the reflection-increasing coating is a metallization which is optionally covered by a glazing ink layer and the embossing lacquer layer on the side opposite the relief structure additionally has a plane metallized area and a further glazing ink layer, the color tone of the optional glazing ink layer and the color tone of the further glazing ink layer preferably being different color tones, e.g. red and green; or (b) the reflection-increasing coating is a metallization which is covered by a glazing ink layer and the embossing lacquer layer on the side opposite the relief structure additionally has a plane metallized area and optionally a further glazing ink layer, the color tone of the glazing ink layer and the color tone of the optional further glazing ink layer preferably being different color tones, e.g. red and green.

According to a preferred embodiment, both the glazing ink layer and the further glazing ink layer are present.

7. (Preferred configuration) Platelet-shaped pigment according to any of sections 1 to 6, where the pigment additionally has a magnetic layer.

8. (Second aspect of the invention) Printing ink with platelet-shaped pigments according to any of sections 1 to 7.

9. (Preferred configuration) Printing ink according to section 8, where the printing ink is a screen-printing ink, flexographic-printing ink or gravure-printing ink.

10. (Preferred configuration) Printing ink according to section 8 or 9, where the printing ink has two or more pigment types which differ in terms of their color impression.

11. (Preferred configuration) Printing ink according to section 10, where the printing ink has two pigment types, the first pigment type being based on platelet-shaped pigments according to any of claims 1 to 7 and the second pigment type being based on conventional platelet-shaped metallic pigments with a plane reflection layer.

The plane reflection layer is in particular a metallic reflection layer.

According to a special variant, the conventional platelet-shaped metallic pigment can have a plane reflection layer, which has a glazing ink layer on both the top side and bottom side. The glazing ink layers preferably have the same color tone.

12. (Third aspect of the invention) Security element for safeguarding value documents, in particular bank notes, comprising platelet-shaped pigments according to any of claims 1 to 7 or obtainable by using a printing ink according to any of claims 8 to 11.

13. (Fourth aspect of the invention) Method for manufacturing a platelet-shaped pigment according to any of sections 1 to 7, comprising
a) supplying a carrier substrate, e.g. a carrier foil;
b) applying an embossing lacquer onto the carrier substrate;
c) embossing a relief structure into the embossing lacquer;
d) providing the relief structure with a reflection-increasing coating;
e) the step of further processing and crushing the obtained layer construction into individual platelet-shaped pigments.

14. (Preferred configuration) Method according to section 13, where in step e), before the crushing of the obtained layer construction into individual platelet-shaped pigments, first the detaching of the carrier substrate from the coated embossing lacquer is effected.

DETAILED DESCRIPTION OF THE PREFERRED EMBODIMENTS

Subject matter of the present invention are in particular:
a) platelet-shaped pigments which are provided with such a relief structure that incident light is reflected in a different direction compared to pigments with a plane reflecting surface or boundary surface.
b) platelet-shaped pigments in which the relief structure is additionally provided with a reflection-increasing coating, in particular a metallization.
c) platelet-shaped pigments in which the reflection-increasing coating additionally is colored and/or a colored impression is produced by means of a glazing ink applied at least on one side.
d) a printing ink, in particular a screen-printing ink, which contains one or different kinds of the above-mentioned pigments.
e) a screen-printing ink in which the pigments of the invention are present in a glazing colored matrix or in a glazing colored binding agent.
f) a printing or lacquering method for producing color-shifting layers, in which at least one ink layer is obtained by using one or more of the pigments described above by means of printing or lacquering.
g) a security feature which is obtainable by printing technology by means of the printing ink according to the invention.
h) a decorated object which is obtainable by printing technology or by lacquering with the printing ink according to the invention.
i) a security feature which is obtainable by printing technology by means of the printing ink according to the invention, where on the security feature arranged on the value document substrate (in particular a paper substrate) a partial embossing so that the relief structures of the pigments of the invention are equalized or significantly reduced in the region of the embossing or are replaced by another kind of relief structure. The partial embossing can be effected e.g. by means of a numeric printing mechanism or an intaglio printing plate having defined engravings.

Further embodiment examples as well as advantages of the invention will be explained hereinafter with reference to the figures, in whose representation a rendition that is true to scale and to proportion has been dispensed with in order to increase the clearness.

BRIEF DESCRIPTION OF THE DRAWINGS

There are shown:

FIGS. 7(a) and 7(b) the production of pigments of the invention reflecting in a colored manner, by means of a colored metallization (FIG. 7(a), top) or by means of glazing multicolored layers (FIG. 7(b), bottom);

FIG. 8 two different pigment types which reflect incident light in different directions and with different colors;

FIG. 9 the effect of a printing ink which contains the two pigment types of FIG. 8 in the form of a mixture;

DETAILED DESCRIPTION OF VARIOUS EMBODIMENTS

In the description, in particular in the context of printing inks, the abbreviations "SB" (stands for solvent-based binding agent), "WB" (stands for water-based binding agent) and "UV" (stands for UV-drying or UV-curing binding agent) are used.

Figure 1:
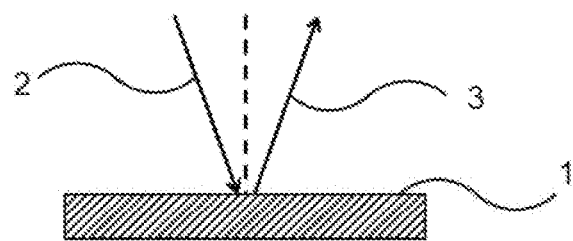
FIG. 1 the light reflection at a plane surface.

Printing inks with platelet-shaped metal pigments are known in the prior art. Such pigments reflect incident light 2 substantially in specular reflex, i.e. the light reflection is effected in such a way that the angle of incidence and the angle of reflection are equal with respect to the surface normal (drawn in dashed line in FIG. 1). FIG. 1 shows the light reflection 3 at a plane surface 1.

Figure 2:
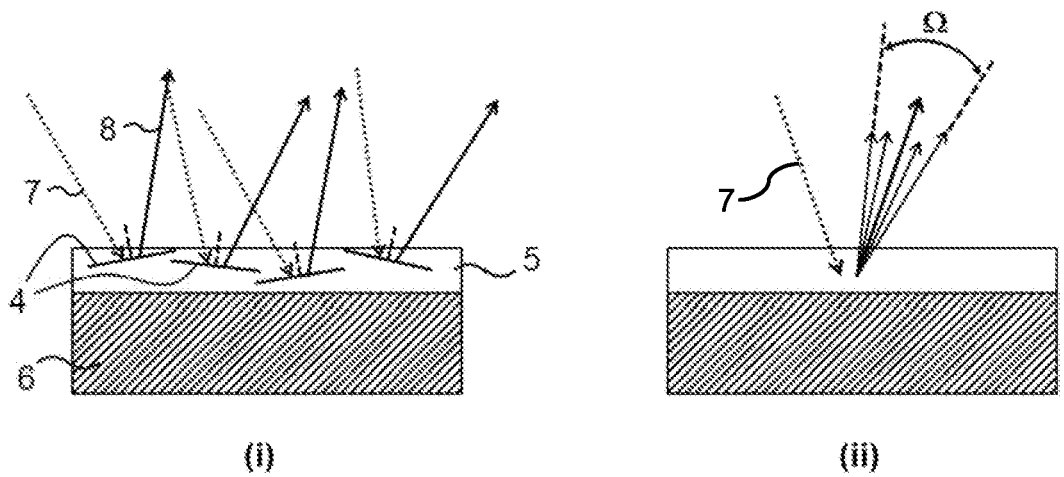
FIG. 2 shows the light reflection at reflecting pigment platelets, FIG. 2(i) showing a detail view with slightly tilted platelets within the ink layer and FIG. 2(ii) describing the thus obtained macroscopic expansion of a reflected light beam.

In a printing ink according to the invention, a multiplicity of the pigments of the invention is present. If the ink is printed on a (paper) substrate, the pigments arrange themselves substantially parallel to the substrate surface. Incident light is then no longer reflected exactly in one particular direction, but in a certain angle region Ω. The width of the angle region Ω depends on how far the actual alignment of the pigments deviates from an alignment perfectly parallel to the substrate surface. FIG. 2 illustrates the light reflection 8 of the incident light 7 at reflecting pigment plates. FIG. 2(i) shows a detailed view with slightly tilted platelets 4 within the ink layer 5 located on a printing stock 6, e.g. a paper substrate. FIG. 2(ii) describes the thus obtained macroscopic expansion of a reflected light beam. In FIG. 2(i), the dashed lines symbolize the respective surface normal of the pigment platelet, the dotted arrows symbolize the incident light and the solid arrows symbolize the reflected light.

Figure 3:
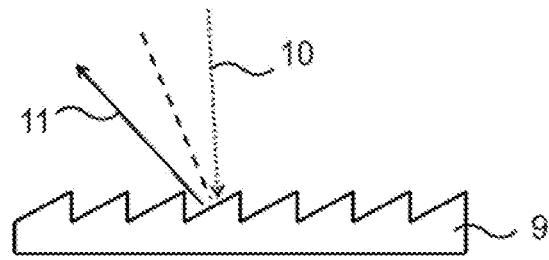
FIG. 3 a pigment platelet according to the invention having a relief structure which leads to a light reflection direction deviating from the macroscopic surface normal of the pigment platelet.

A pigment platelet according to the invention has such a relief structure that light incident at least from one side is not reflected in the direction of the specular reflex—with respect to the plane of the platelet—, but is reflected at an angle deviating therefrom or at an angle region deviating therefrom. This can be achieved in particular by using a sawtooth-shaped relief structure with regularly or irregularly arranged microfacets or micromirrors. In this case, incident light is reflected only with respect to the surface of the individual microfacets in the direction of the specular reflex which deviates from the macroscopic surface normal of the pigment platelet. FIG. 3 shows a pigment platelet 9 according to the invention having a relief structure which (in the case of light perpendicularly incident on the pigment platelet) leads to a light reflection direction 11 of the incident light 10 which deviates from the macroscopic surface normal of the pigment platelet.

Figure 4:
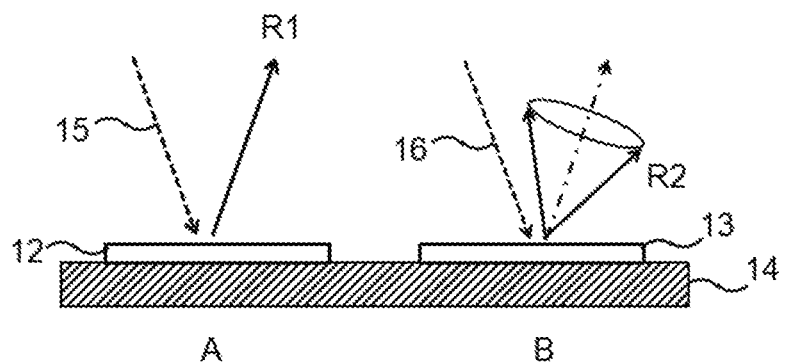
FIG. 4 the light reflection at an ink having conventional pigment platelets in the region A and at inks according to the invention in the region B.

FIG. 4 shows the light reflection in the case of an ink 12 with conventional pigment platelets in the region A and in the case of an ink 13 according to the invention in the region B. The reference sign 14 here refers to the printing stock, e.g. a paper substrate. If an ink 12 is printed with conventional, flat pigments in the region A, the pigments (assuming a perfect alignment parallel to the substrate surface) reflect incident light 15 in a direction "R1". A printing ink 13 with the pigments of the invention in the region B reflects the incident light 16 in a different direction, more precisely in different directions "R2". Normally, the pigment platelets according to the invention are aligned parallel to the surface, but can be arbitrarily present within this plane with regard to rotation. The light reflected at these pigment platelets is therefore not reflected in one particular direction, but in many directions "R2", all of which are present along a cone arranged around the direction "R1". The aperture angle of the cone, i.e. the deviation from the reflection direction of conventional pigment platelets or metallic silver inks, results from the inclination of the reflecting facets to the macroscopic surface of the pigment platelet.

In summary, in the case of an ink having the pigment platelets according to the invention the incident light is reflected in different directions than in the case of an ink with conventional pigment platelets having plane reflection areas. This applies even if the pigments do not align themselves exactly parallel to the substrate, but deviate by a slight angle of a few degrees. In this case, the reflection direction "R1" becomes an accordingly larger angle region and the cone of directions "R2" increases. So as to be able to separate the light reflected in the region A and in the region B, the inclination of the facets in relation to the pigment plane is expediently selected such that it is greater than the variation in pigment alignment arising from the printing of the pigment ink.

Figure 11:
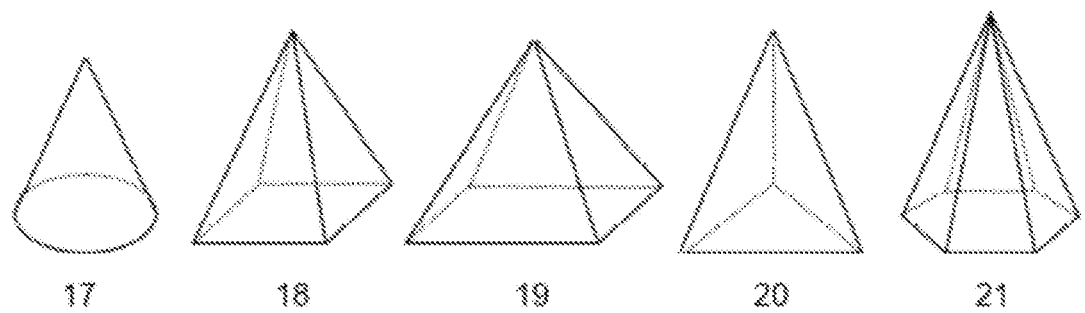
FIG. 11 further implementation variants for the microstructure elements.

In order to reduce the losses of reflected light, a quality of the relief structure in the form of a symmetrical relief structure is advantageous, because in this case the incident light is reflected not only in one angular position but in two angular positions. Relief structures which reflect the incident light in more than two angular positions are particularly advantageous. As shown in FIG. 11, this is the case e.g. with cones 17, truncated cones, pyramids and truncated pyramids as basic elements. In the case of a pyramid there may be present e.g. a square pyramid 18, a rectangular pyramid 19, a triangular pyramid 20 or a hexagonal pyramid 21. It is advantageous when the flank angle of the individual relief structure basic elements is uniform within the pigment. In printing ink, pigments can be present in a uniform form, but there can also be employed printing inks based on a mixture of several different pigments which differ in color and/or flank angle.

Figure 5:
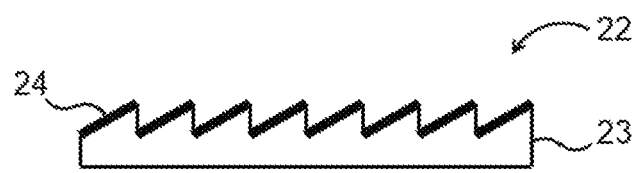
FIG. 5 a pigment of the invention according to an embodiment example.

The pigment platelets according to the invention have the advantage of an embossed relief structure and a reflection-increasing or reflecting coating, in particular a metallization such as e.g. aluminum. FIG. 5 shows a pigment 22 according to an embodiment example with an embossing lacquer 23 having a relief structure and a discontinuous or interrupted metallization 24. The relief structure consists of sawteeth, on the longer side of each sawtooth there being respectively present a metallization (represented by a thickened line in FIG. 5). Such a metallization can be achieved, e.g., by oblique evaporation of a metallization. Alternatively, however, the metallization could also be present over the full area or continuously on the entire sawtooth relief.

A preferred manufacturing method for the pigment according to the invention includes the following steps:
applying an embossing lacquer onto a carrier foil;
embossing a relief structure into the embossing lacquer;
the step of metallizing the relief structure;
further processing the obtained layer construction into individual pigments.

In the step of further processing the obtained layer construction into individual pigments, the metallized embossing lacquer can be drawn off the carrier foil and crushed into pigments of suitable size. Optionally, between carrier foil and embossing lacquer there can be additionally provided a release layer, e.g. a release lacquer layer, which facilitates the separation between embossing lacquer and carrier foil. Further, it can be advantageous to additionally apply a protective lacquer onto the metallization.

Preferred ways for the treatment directly in the course of the PVD method, or at least prior to detaching the carrier foil and thus prior to the actual pigment manufacturing ("particle sizing") are in particular:

1. A sol-gel coating before the "stripping" via dip coating, spin coating, spray coating, inkjet printing, tampon coating, microdrop coating, gravure printing, flexoprinting, screen printing, sol-gel bath with alkoxysilanes.

2. A physical vapour deposition (PVD method) with $SiO_2$ and/or $Al_2O_3$ and/or ZnS and/or $TiO_2$, so that the corrosion-sensitive metal pigment (in particular aluminium) is embedded or protected in a sandwich (construction e.g. $SiO_2$/Al/$SiO_2$) and subsequently optionally a coating according to the above section 1 (e.g. for a leafing pigment).

3. A chemical vapour deposition (CVD method) or a plasma-enhanced chemical vapour deposition.

4. Plasma-chemical vapour deposition (or plasma coating) with e.g. fluorocarbon polymers, plasma deposition of glassy, thin layers based on silicon-organic monomers, e.g. hexamethyldisiloxane (HMDSO), or tetraethoxysilane.

It may also be advantageous to phosphate the pigment in order to protect it from corrosion.

In order to avoid damage to the pigments when they are introduced into a printing ink binding agent, the pigments are preferably gently dispersed, e.g. by means of an open three-roll mill, or mixed in, e.g. by means of a propeller stirrer as a tool.

As a binding agent matrix there are suitable e.g. solvent-based, water-based, dual-cured UV-drying binding agents (WB/UV or SB/UV) and UV-drying binding agents for gravure printing, flexoprinting and screen printing. The pigment is present in the printing ink in a suitable manner, e.g. in a region from 2 wt. % to 20 wt. %. The orientation of the pigments can be positively influenced by the usage of additives and/or by a low viscosity of the entire ink. With UV-crosslinking inks it is advantageous to apply the ink at a slightly elevated temperature (e.g. 30° C. instead of 20° C.) because the temperature increase reduces the viscosity.

Example of a UV Flexographic-Printing Ink and a Screen-Printing Ink (Radical, Leafing Pigments)

Pigment Preparation (Leafing)

The pigment is present e.g. as a 50%-dispersion in liquid photoinitiator or reactive diluent. Such a paste is obtained by rewetting from organic solvent with prior addition of dissolved octylphosphonic acid, laurylphosphonic acid or mono-/diphosphoric acid stearyl ester (Note: the term "rewetting" comes from surfactant chemistry and describes the accumulation of a surfactant-like substance (e.g. a long-chain phosphoric or phosphonic acid) on the surface of a pigment; this changes the surface tension of the pigment, e.g. from polar to non-polar; the solvent serves only as a reaction medium and is removed, so that the pigment preparation becomes pasty).

Pigment preparation (leafing): 4-7%
Monomer/reactive diluent: 30-40%
prepolymers/oligomers: 40-60%
Defoamer: 0-1%
Wetting agent: 0-1%
Waxes: 0-3%
Stabilizer (HALS, antioxidants): 0.5-3%
Photoinitiators: 4-15%
Coinitiators (e.g. amine synergist, ITX, benzophenone): 0-4%

Examples of Initiators

Benzoyl phosphine oxides, aminoketones, hydroxyketones, benzilketals
Examples of Monomers/Reactive Diluents:
PEA 2-phenoxyethylacrylate
HDDA hexanediol diacrylate
TPGDA tripropylene glycol diacrylate
TMPTA trimethylolpropane triacrylate
TMP(EO)xTA ethoxylated trimethylolpropane triacrylate
GPTA propoxylated glycerol triacrylate
PETA pentaerithritol triacrylate
DiTMPTTA ditrimethylolpropane tetraacrylate
DiPEPA dipentaerithritol pentaacrylate
DPHA dipentaerithritol hexaacrylate
DVE-3 triethylene glycol divinyl ether Examples of Oligomers Highly structured (prepolymerized) epoxy acrylates, urethane acrylates, polyester acrylates, polyether acrylates, inert resins UV Gravure Printing Ink formulation expediently contains higher portions of very low-viscosity reactive diluents, such as DVE-3 or HDDA and less/lower-viscosity prepolymer portions; processing at higher temperatures up to 40° C. is advantageous.

UV Offset

Ink formulation contains highly viscous/highly structured, (for wet offset) less hydrophilic monomers and a relatively high prepolymer portion.

Components UV-Cationic (Leafing Pigments)

Prepolymers: Bisphenol-A diglycidyl ether, epoxy novolac, dentrimers, reactive diluent: Epoxides, divinyl ether, polyols, oxetanes, photoinitiators: Sulfonium salts and iodonium salts.

Components Wet/Dry Offset, Letterpress e.g. modified colophony resins, hydrocarbon resins, alkyd resins, unsaturated vegetable oils, animal oils and/or solvents such as mineral oils and fatty-acid esters; Co/Mn catalyst and where applicable auxiliaries.

Components Solvent Printing Inks (Non-Leafing Pigments)

e.g. cellulose, in particular nitrocellulose resins; vinyl polymerizates, in particular polyvinyl butyral, where applicable polyamides; solvents: Alcohols, ketones, esters, hydrocarbons; where applicable auxiliaries.

Expediently, for solvent-based printing inks the pigment portion is selected as high as possible, e.g. more than 30% solids content. The ratio of pigment/binding agent is preferably about 1:2 or more pigment portion. Normally, the pigment portion should be selected so high that the requirements for the printing ink, e.g. abrasion, adhesion and overprinting, are only just satisfied. The total solids content in the printing ink should in turn be as low as possible, preferably less than 10% in relation to the printing ink. A dilution can be effected e.g. by using solvents.

Components Aqueous Printing Inks (Non-Leafing Pigments)

Acrylates, maleates, polyesters, polyurethanes, water, isopropanol, ethanol, where applicable auxiliaries, in particular defoamers, wetting additives, dispersing agents and pigment stabilizers.

Aqueous UV: Supplemented with acrylic dispersions and photoinitiator.

Figure 6:
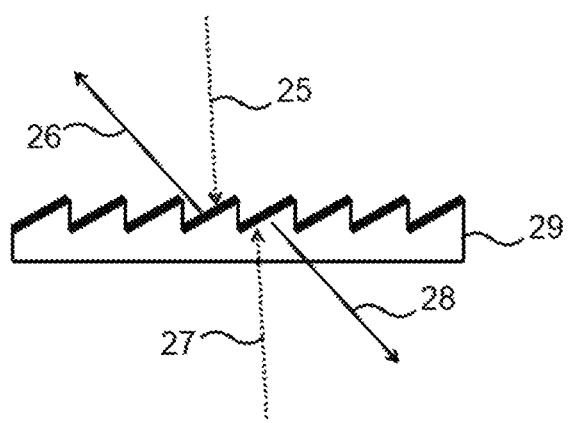
FIG. 6 the light reflection at the top side and at the bottom side of a pigment platelet of the invention according to a further embodiment example.

If a transparent embossing lacquer is used, light incident from both sides may be reflected in directions which deviate from the specular reflex according to the macroscopic surface normal of the platelet (see FIG. 6). FIG. 6 shows the light reflection 26 of incident light 25 at the top side and light reflection 28 of incident light 27 at the bottom side of a pigment platelet 29 according to another embodiment example. The relief structure consists of sawteeth, on the longer side of each sawtooth there being respectively present a metallization (represented by a thickened line in FIG. 6). Such a metallization can be achieved, e.g., by oblique evaporation of a metallization. Alternatively, however, the metallization could also be present over the full area on the sawtooth relief.

A metallization and an embossing on one side of the pigment are thus absolutely sufficient, when an embossing lacquer is used which is preferably transparent at least in the VIS region in order to achieve the desired effect on the top side and on the bottom side. It is therefore irrelevant whether after printing the pigment color onto an object to be printed the pigment points to the object with its top side or with its bottom side.

According to another preferred embodiment, the pigments reflect incident white light in a colorful rather than a white way. If for example instead of an aluminium metallization a gold metallization or a copper metallization is used, the reflected light accordingly has the color of gold or copper. Instead of gold, a cheaper, gold-colored alloy can be chosen, e.g. an alloy based on aluminium and copper. Furthermore, the color range can be enlarged by the evaporation of a multilayer system. For example, a thin Si layer on an Al metallization may impart a gold or blue appearance to the latter. In particular, such an Si layer can be vapour-deposited on both sides of an Al layer. This means that the embossing lacquer would be vapor-coated with an Si/Al/Si multilayer system. Such multilayer systems are known in the prior art, see e.g. WO 2016/188619 A1.

Alternatively, instead of a colored metallization, a glazing (i.e. without scattering or totally covering colorants, e.g. in the form of undissolved dyes or pigments) ink can be used. To achieve a green color effect one could work e.g. with a green-dyed embossing lacquer and, where applicable, with an additional glazing green ink layer above the metallization. FIG. 7a) illustrates the production of pigments 30 of the invention reflecting in a colored manner, by means of a colored metallization 31, in the example a copper metallization. The reference number 32 refers to an embossing lacquer with an embossed relief structure. The relief structure consists of sawteeth, on the longer side of each sawtooth there being respectively present a metallization (represented by a thickened line in FIG. 7a). Such a metallization can be achieved, e.g., by oblique evaporation of a metallization. Alternatively, however, the metallization could also be present over the full area on the sawtooth relief. FIG. 7b) illustrates the production of pigments 33 of the invention reflecting in a colored manner, by means of glazing colorful layers 34 and 36. The reference number 36 refers to a green-dyed embossing lacquer with an embossed relief structure. The reference number 34 refers to a green covering lacquer. The relief structure consists of sawteeth, on the longer side of each sawtooth there being respectively present a metallization 35 (represented by a thickened line in FIG. 7b). Such a metallization can be achieved, e.g., by oblique evaporation of a metallization. Alternatively, however, the metallization could also be present over the full area on the sawtooth relief.

Figure 14:
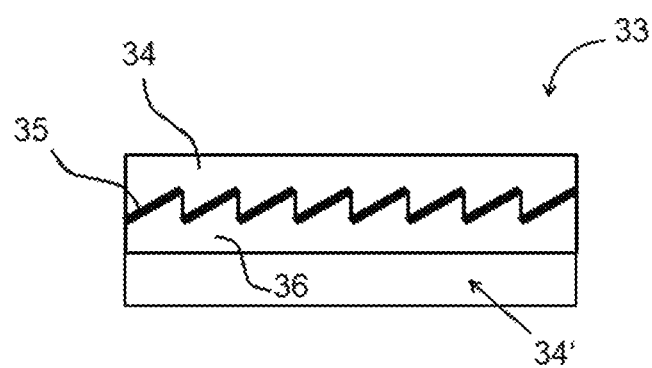
FIG. 14 a further implementation variant.

With reference to FIG. 14, in this section there is explained a further alternative implementation variant. The layer 36 is a non-dyed, transparent embossing lacquer. The layer 35 is a metallization and the layer 34 is a transparent ink layer. The layer 34' is a further glazing ink layer located beneath the embossing lacquer layer 36, which preferably has the same color tone as layer 34. This ensures that, irrespective of the position of the pigments, the top-view color tone of the pigments does not change macroscopically or that it does not come to a mixed color due to differently dyed pigment sides. The further glazing ink layer 34' here can be applied prior to or after the embossing.

In principle, instead of a dyed embossing lacquer, a colorless embossing lacquer can be underlaid with a glazing colored layer which is applied before the embossing lacquer. Alternatively, there may be further layers between the embossing lacquer layer and the glazing ink layer which are transparent.

Furthermore, it is possible to embed colorless pigments in a dyed binding agent or to coat a printing ink of the invention with a further glazing ink layer in order to obtain a desired color effect. Furthermore, in the case of a transparent (paper) substrate to be printed, a corresponding glazing ink layer could be printed already before the printing of the printing ink containing the pigments of the invention in order to obtain a color effect.

Color change effects can be achieved by combining pigments of the invention having different colors and different facet inclinations with each other. This makes it possible, for example, to flexibly manufacture from a basic pigment range (such as e.g. yellow, magenta and cyan, where applicable additionally orange and/or green) almost any color tone from pigment mixtures or ink mixtures of monopigmented basic inks according to customer requirements. The facet inclination (or relief structure) here is preferably the same. In the simplest case, a pigment type has no inclination at all, i.e. it is merely a colored pigment with a plane reflection layer. According to the embodiment example shown in FIG. 8, green pigments 37 (FIG. 8, left side) having a relief structure are used as a first pigment type in combination with red pigments 41 (FIG. 8, right side) having a plane reflection layer as a second pigment type. In the case of the first pigment type, incident light 56 is reflected green in a first direction "RG", in the case of the second pigment type, incident light 56 is reflected red in the direction "RR". The green pigment 37 contains a green-dyed embossing lacquer 38 with an embossed relief structure. The reference number 39 refers to a green transparent lacquer (or covering lacquer) which is arranged above the embossing lacquer. The relief structure consists of sawteeth, on the longer side of each sawtooth there being respectively present a metallization 40 (represented by a thickened line in FIG. 8). Such a metallization can be achieved, e.g., by oblique evaporation of a metallization.

If pigments are provided with a discontinuous metallization, in an angular position like the "sawtooth" 35 (acute angle) these pigments show a greatest possible transparency or a smallest possible reflectivity due to the lack of metallization of the vertically arranged flank. This leads to the fact that, at this angular position, a further colored printing layer arranged below the printing ink based on the pigments of the invention can be recognized particularly well, or, in the case of an application on a transparent substrate, the greatest possible transmission of light can be detected.

In another variant, a first metallic layer is vapor-deposited discontinuously, a second metallic layer of a different color is vapor-deposited continuously and a third metallic layer in the same color as the first metallic layer is vapor-deposited discontinuously again, so that a different color in the reflection can be recognized at the angular position like sawtooth 35.

Alternatively, however, the metallization could also be present over the full area on the sawtooth relief. The red pigment 41 (FIG. 8, right side) is based on a plane metallization 42 which has a red glazing ink layer 43 on the top side and a red glazing ink layer 44 on the bottom side.

FIG. 9 shows the obtainable area with angle-dependent color impression, (i) when the two pigment types 37 and 41 shown in FIG. 8 are mixed into a uniform printing ink and printed onto an object to be printed, or (ii) when a first ink layer with only the one pigment type is printed onto an object to be printed and then a second ink layer with only the further pigment type is printed on the first ink layer, or (iii) when printed first and second printing regions nested in each other are present on an object to be printed, of which the first printing region is produced with merely the one pigment type and the second printing region is produced with merely the further pigment type. This results in the effect of a mixed ink containing the two pigment types shown in FIG. 8. A part of the incident light 57 is reflected green in the direction "RG", another part is reflected red in the direction "RR". A viewer sees a red color from the direction "RR" and a green color from the direction "RG". The green pigments contained in the combination reflect incident light in green in the "RG" direction, the red pigments reflect light in red in the "RR" direction. Thus, from the direction "RG" the area appears green to a viewer and from the direction "RR" red. Thus, one has obtained a printing ink with direction-dependent color impression.

Depending on the choice of the pigment types to be used, where applicable in combination with a colored binding agent and/or a glazing ink, practically any color impression and color changes can be realized.

Instead of using two pigment types (e.g. pigments 37 and 41 shown in FIG. 8) in combination, it is possible to work alternatively with only one pigment type, provided that the pigments have different reflection colors and reflection directions on their top side and bottom side. For example, a pigment 45 shown in FIG. 10 could be used with the following layer construction:

first glazing ink layer 46, e.g. red;
plane, metallized area 47;
embossing lacquer 48 which has a relief structure embossed into the embossing lacquer;
a second metallization 49, the surface quality of which follows the relief structure embossed into the embossing lacquer (the relief structure consists of sawteeth, with a metallization 49 being present respectively on the longer side of each sawtooth (represented by a thickened line in the Figure); such a metallization can be achieved, e.g. by oblique vapor deposition of a metallization; alternatively, the metallization could also be present over the full area of the sawtooth relief);
second glazing ink layer 50, e.g. green.

A pigment having the layer construction described in the previous section thus combines on its top side and on its bottom side the effects of the pigment types shown in FIG. 8 on the left and right side. If one assumes that such "combination pigments" settle on the object to be printed with their red side on the one hand and their green side on the other hand with respectively the same high probability, one obtains practically the same effect as with a 50/50 mixture of the pigment types of FIG. 8.

Figure 10:
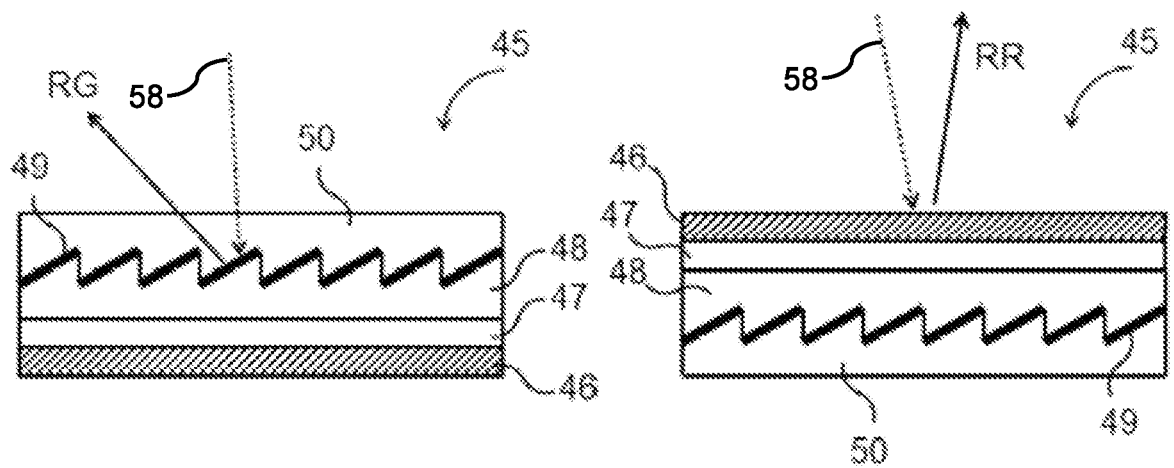
FIG. 10 a combination pigment which depending on its orientation (i.e. the relief structure faces the object to be printed (FIG. 10, on the right) or the relief structure faces away from the object to be printed (FIG. 10, on the left)) reflects the light in different colors in different directions.

FIG. 10 shows an above-described combination pigment which depending on its orientation (i.e. the relief structure faces the object to be printed (FIG. 10, on the right) or the relief structure faces away from the object to be printed (FIG. 10, on the left)) reflects the light 58 in different colors in different directions.

With reference to the implementation variant shown in FIG. 10, it should be noted at this point that according to a variant (not shown in the drawings), instead of two ink layers, the pigment may contain only one ink layer and, e.g. a colored metallization. With reference to FIG. 10, one could dispense with e.g. a yellow ink layer 46, when the metallization 47 is golden. This applies analogously to the layers 49 and 50.

In principle, instead of using two pigment types in combination, three or more pigment types can also be used in combination, whereby the pigment types differ in terms of the relief structure facet inclination and/or in terms of the color impression. Thus, also further-reaching variants with multiple color changes, e.g. green to red to blue or the like, can be realized.

The pigments of the invention may expediently have an additional magnetic layer. In this way pigments are obtainable which can be aligned by the usage of magnetic fields. In this way, a multiplicity of dynamic motion effects and color effects can be achieved. If, for example, the green and red pigments shown in FIG. 8 are respectively furnished with a magnetic layer, the thus obtained pigments can show red-green motion effects after being printed on an object to be printed and the alignment of the pigments in a magnetic field. Similar motion effects are known in the prior art, e.g. in connection with commercially available OVMI inks, see, among others, the safety feature Sicpa SPARK®.

According to another implementation variant, the magnetic layer can be present in a structured manner in the pigment of the invention. The structuring of the magnetic layer can be effected in particular via embossing. The structuring here can also be carried out by an inclined (vacuum) vapor deposition. The embossing can then be coated with a magnetic material, alternatively the embossing can also take place after the coating. Possible are, e.g. coatings which contain Fe, Ni and/or Co. Typical layer thicknesses are e.g. in a region of 50 nm to 500 nm, preferably in a region of 50 nm to 300 nm. In this way, the pigments can be prevented from rotating arbitrarily with respect to the rotation in the substrate plane, i.e. around their normal vector, rather, by a suitable structuring there can be achieved a magnetic anisotropy in the plane of the pigments. By means of a stripe-shaped structuring of the magnetic layer (e.g. a line grating with a preferred grating period in a region from 100 nm to 5 micrometers, more preferably 100 nm to 1000 nm, and a preferred depth of 50 nm to 0.5 micrometers, more preferably 100 nm to 300 nm) it can be achieved, for example, that the pigments rotate around their normal vector in such a way that the lines of the magnetic structuring are oriented parallel to the magnetic field. In an external magnetic field, such pigments will thus preferably align themselves in such a way that the pigment plane is parallel to the field lines and that the pigment rotates around its normal vector in such a way that the grating lines are also parallel to the magnetic field lines. As an alternative to generating a magnetic anisotropy in the pigment plane by embossing structures, a magnetic anisotropy can also be achieved by the platelet-shaped pigments not being circular or substantially as wide as they are long, but having an elliptical or generally elongate shape. Elongate platelets align themselves in an external magnetic field preferably in such a way that the plane of the platelets is parallel to the field lines and the long axis points in the direction of the field lines.

When using a magnetic grating structure for introducing a magnetic anisotropy, it is to be taken into account that the magnetic grating structure also causes, besides this magnetic effect, a visually recognizable optical effect which is determined by the grating parameters, and here mainly by the period. If the grating period is approximately in the region of the wavelength of visible light, mainly diffractive effects occur which are typical for embossed holograms. With a smaller period in the subwavelength region, plasmon and resonance effects can be observed which lead to color changes in the specular reflex. When using color-shifting coatings (e.g. with reflector/dielectric/absorber multi-layer construction), these can also be changed in their color effect.

The magnetically anisotropic coating can be realized in addition to the reflecting relief structure. In this case, two embossings are expedient. For example, the pigments in FIG. 10 could have a grating-structured magnetic layer instead of the further plane metal layer in addition to the reflecting relief structure, i.e. in addition to the micromirror layer. This would lead to the optical appearance of the pigments being modified by the optical effect of the grating. The orientation of the grating lines relative to the orientation of the micromirrors can be selected in the manufacturing process. With the aid of an external magnetic field, the desired alignment of the micromirrors can then be achieved via the anisotropy of the grating lines. For example, the magnetic grating structures are arranged in the plane which is spread by the normal vector of the micromirrors and the normal vector of the pigment. From the cone of reflection directions of the pigments, which has been described above, ultimately only two directions on this cone are selected. In this way, e.g. print patterns are realizable in which red and green regions are present in a manner substantially better separated from each other.

In one variant, the micromirror structures required for the micromirror effect overlap with the grating structures required to generate the magnetic anisotropy. In this case too, the optical effect of the pigments is modified by the presence of the magnetic structures.

In order to achieve the best possible effects when printing the printing ink with the pigments of the invention, it is advantageous to use low-viscosity binding agent systems which allow a good orientation of the pigments. It is further preferred to employ printing methods which allow the processing or application of large, flat pigments, therefore screen printing methods, flexoprinting methods and gravure printing methods are preferred.

The pigments of the invention can also be used for manufacturing a security element for safeguarding value documents, in particular bank notes. According to a preferred embodiment, a color change from a first to a second color effected upon tilting the value document is produced. According to a special embodiment, one of the two colors can be non-colorful or non-colored (in particular white), which can be carried out e.g. with colorless metallized pigments.

Furthermore, it is possible to print a printing ink containing the pigments of the invention over a dark background, e.g. a black area. In this case, from some viewing angles the area appears dark, in particular black (i.e. outside the angle of reflection), and from other viewing angles colored which renders a contrast that is particularly easy to observe. The background print may be present in particular in the form of a pattern or in the form of characters, such as a numeral value.

With regard to the optical effect obtained, it is basically advantageous when the pigments of the invention are arranged as parallel as possible to the surface of the object to be printed. The best possible alignment parallel to the printing stock or printing substrate can be achieved in the case of rough printing substrates, e.g. by printing a suitable primer reducing the surface roughness.

The effect according to the invention is intensified when reference fields for a plan view are obtainable in the immediate surrounding field of the print based on the pigments of the invention or when an illumination is carried out by means of a diffuse illumination source and/or upon viewing with a directed light at the flank angle of the relief structure (reflection).

Furthermore, the effect according to the invention can be intensified by arranging a first printed field based on a first pigment type with a first coloring and a first flank angle in the immediate neighborhood of a second printed field based on a second pigment type with a second coloring and a second flank angle, so that in the ideal case hidden information is only revealed when the illumination angle is changed.

Furthermore, it is possible to emboss a print based on the pigments of the invention after application by means of an embossing tool or a printing plate, preferably by means of a steel engraving plate, at least in partial regions, so that the relief structure of the pigments is at least significantly reduced or overlaid with another relief structure so that in the region of the embossing there arises a different color impression than in the region outside the embossing region. Effect upon illumination with directional light in the flank angle of the relief structure.

In another variant, a partial area of the print based on the pigments of the invention is marked by means of an Nd:YAG laser, so that only the reflector layer of the pigment is removed, while the coloring is retained. In this case the marked area shows no directional reflection at the flank angle of the relief structure.

In another variant, a printing ink based on a non-dyed pigment according to the invention is applied onto a transparent (paper) substrate area. Then the first side of the substrate is dyed with a different glazing color than the second of the substrate area. Thus, in top view when viewed with diffuse light, different colors appear, whereas when viewed with directed light under the flank angle of the relief structure, a similar color impression appears.

The pigments of the invention preferably have a width or pigment dimension in a region from 10 µm to 60 µm. The thickness of the pigments of the invention is preferably less than 5 µm. More preferably, the pigments of the invention have a width (D50) in a region from 5 µm to 30 µm, in particular a width (D10-D90) in a region from 3 µm to 50 µm. In particular, the pigments of the invention have a width (D50) in a region from 10 µm to 20 µm, in particular a width (D10-D90) in a region from 5 µm to 35 µm.

It is preferred that the relief structure of the pigment of the invention consists of regular sawtooth gratings or micromirror arrangements. The facets of the relief structure have a preferred embossing depth of less than 10 µm, further preferably less than 5 µm and particularly preferably less than 3 µm. The width of the facets of the relief structure is preferably less than 20 µm and in particular preferably less than or equal to 10 µm. The width of the facets of the relief structure is also referred to as the lateral dimension 1 in the present description. To avoid diffraction effects, the facets of the relief structure have a preferred dimension (or the sawtooth gratings have a preferred period) of more than 2 µm, more preferably more than 4 µm and particularly preferably more than 6 µm.

It is preferred that the angle of inclination of the reflecting facets of the relief structures is in a region of 3° to 60°, with the region of 10° to 30° being particularly preferred.

The embossing lacquer is preferably a UV embossing lacquer. However, thermoplastic embossing lacquers can also be used.

The printing inks containing the pigments of the invention are preferably screen-printing inks, flexographic printing inks or gravure printing inks. However, it is also possible to manufacture and use other lacquerings, e.g. motor vehicle lacquerings.

In the case of motor vehicle lacquerings or industrial lacquerings, preferably a spray coating (usually WB lacquers), a dip coating (usually WB lacquers) and/or powder coating (in particular electrostatic process) is used. Since a good plane-parallel orientation of the pigments is advantageous for a very good optical effect, the powder coating is less preferred.

The printing inks having the pigments of the invention are preferably based on organic solvents, water, oils or reactive thinners and can be film-forming via actinic rays, penetration and/or evaporation. They can be of a one-component, two-component and/or DualCure structure.

The inks containing the pigments of the invention are preferably printed by means of screen printing. In case the pigments have an additional magnetic layer, a magnetic field can be additionally applied.

The reflecting facets of the relief structures of the pigments of the invention do not all have to be uniformly oriented. It is also possible that the facets have only the same, or at least similar, angles of inclination, but different azimuth angles. It is irrelevant whether a pigment settles on the printing substrate to be printed in a state rotated in the substrate plane or whether the facets of the pigment are present rotated from the outset.

Accordingly, with regard to the relief structure facets, instead of sawtooth gratings there can also be used pyramid structures in a suitable way. Furthermore, good effects can also be achieved with cone structures. Sawtooth gratings, pyramid structures or conical structures are preferred with regard to the relief structure facet arrangements, because the angle of inclination with respect to the macroscopic pigment substrate plane can be adjusted particularly advantageously. In the case of pyramid structures and conical structures, the lateral dimension 1, i.e. the width of the facets of the relief structure, is equal to half the diameter of the base area of the respective structure.

Furthermore, it is advantageous to select the aspect ratio of the pigments (i.e. thickness to length) as large as possible, in particular at least 1:3, in order to achieve an alignment of the pigments as plane-parallel as possible to the (paper) substrate, depending on the rheology of the printing ink's binding agent.

Figure 12:
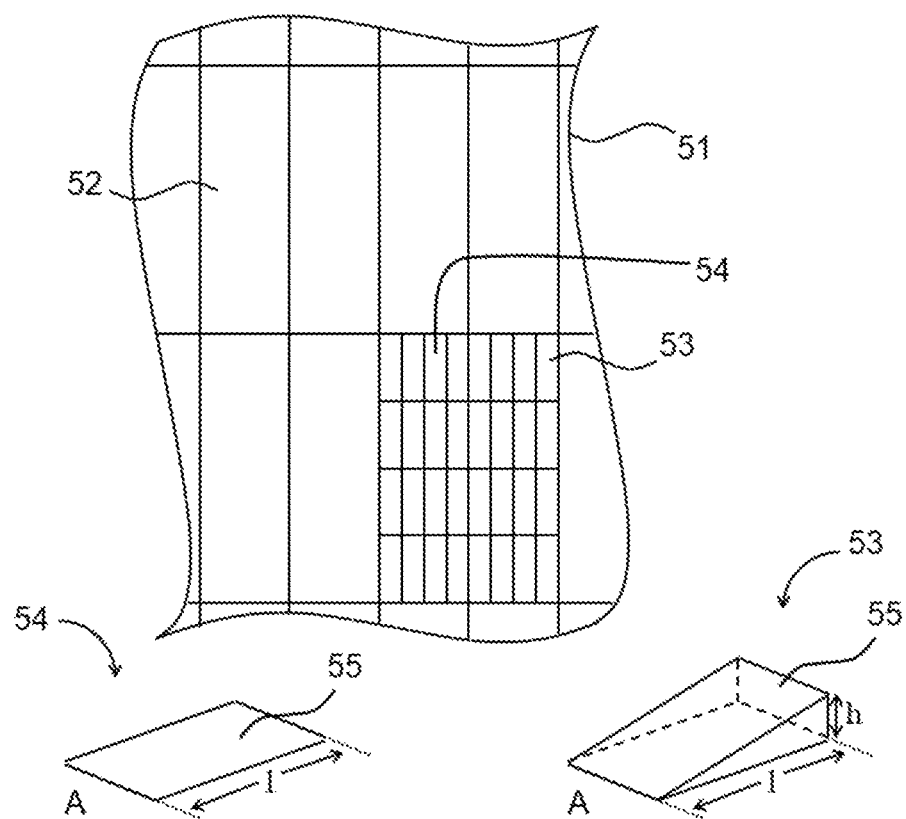
FIG. 12 in a graphically highly idealized form the manufacturing of pigments of the invention.

FIG. 12 shows in a greatly simplified manner an example of the manufacturing of the pigments of the invention. The reference number 51 shows in plan view a web-shaped material 51 which comprises a carrier foil with an embossing lacquer layer applied thereto. The embossing lacquer has a relief structure embossed and metallized therein. In further processing, the web-shaped material 51 is crushed into individual pigments 52, e.g. by grinding (the individual pigments 52 are shown in a highly idealized form in the form of regular rectangles). Where applicable, the metallized embossing lacquer can be removed from the carrier foil before the web-shaped material 51 is crushed into individual pigments 52.

Each pigment 51 contains a plurality of reflecting micromirrors or microfacets 53, 54. The micromirrors are characterized by the parameters size, outline shape, relief shape, reflectivity and spatial orientation and reflect incident light according to the specifications of this parameter set respectively into a particular spatial region. Optically variable security elements with such a microstructure are known from WO 2007/079851 A1 and WO 2011/066991 A2.

For example, the micromirrors 53 and 54 in FIG. 12 respectively have a square base area A, i.e. a square outline shape, and a lateral dimension of 15×15 µm$^2$. The micromirrors moreover have a simple relief shape with one single flat reflection areas 55, which encloses a particular angle of inclination α with the surface of the pigment.

In the case of the micromirror 53 (which has the form of a sawtooth or wedge when viewed from the side), the reflection area 55 has an angle of inclination of α=30° to the surface of the pigment. With a lateral expansion of l=15 µm, this angle of inclination results in a structure height h of h=l*tan(α)=8.7 µm for the micromirror 53. In the case of the second micromirror 54, the reflection area 55 is not inclined against the surface of the pigment (expressed by the angle of inclination α=0°).

Figure 13:
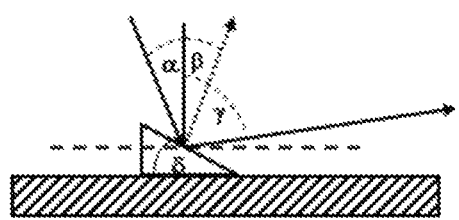
FIG. 13 a complementary representation for illustrating the angle of reflection.

The following is mentioned merely supplementary:

The detection of the angle of reflection can be used as an authenticity feature by means of a special sensor technology (e.g. a manual testing device). For this purpose, for example, the print sample is illuminated by means of a defined angle (relative to the position of the print sample) and the angle is ascertained with the reflection maximum of the reflected light. From this the angular deviation and thus the angle of the sawtooth 35 can be ascertained. This is characteristic for the relief structure of the pigment. In FIG. 13, the angles α here designate:

α=angle of incidence relative to the substrate;
β=expected angle of reflection at total reflection relative to the substrate;
γ=measured angle of reflection relative to the substrate;
δ=angle of the wedge structure relative to the substrate.

The invention claimed is:

1. A disc-shaped pigment with a layer construction which comprises:
   a transparent embossing lacquer layer with an embossed relief structure;
   a reflection-increasing coating which follows the relief structure and forms a reflecting microstructure;
   wherein the reflecting microstructure comprises a mosaic of a multiplicity of reflecting mosaic elements and the multiplicity of reflecting mosaic elements do not reflect incident light in a direction of specular reflex, with respect to a plane of the disc-shaped pigment, but in a spatial direction deviating therefrom, and respectively have a lateral dimension greater than 2 µm;
   wherein the reflection-increasing coating is a metallization which is covered by a glazing ink layer and the embossing lacquer layer is dyed in a color tone which is identical to a color tone of the glazing ink layer.

2. The disc-shaped pigment according to claim 1, wherein the lateral dimension is greater than 4 µm and less than 25 µm.

3. The disc-shaped pigment according to claim 1, wherein the reflecting microstructure comprises elements selected from a group consisting of sawteeth or wedges, cones, truncated cones, pyramids and truncated pyramids.

4. The disc-shaped pigment according to claim 1, wherein the embossing lacquer layer on a side opposite the relief structure comprises a plane metallization layer.

5. The disc-shaped pigment according to claim 1, wherein the pigment additionally has a magnetic layer.

6. A printing ink having disc-shaped pigments according to claim 1.

7. The printing ink according to claim 6, wherein the printing ink is a screen-printing ink, flexographic-printing ink or gravure-printing ink.

8. The printing ink according to claim 6, wherein the printing ink has two or more pigment types which differ in color impression.

9. The printing ink according to claim 8, wherein the printing ink has two pigment types, a first pigment type comprising the disc-shaped pigments having the reflection-increasing coating which follows the relief structure and forms the reflecting microstructure and a second pigment type comprising disc-shaped metallic pigments with a plane reflection layer.

10. A security element for safeguarding value documents, comprising disc-shaped pigments according to or obtainable by using a printing ink according to claim 6.

11. The disc-shaped pigment according to claim 1, wherein
   the embossing lacquer layer on a side opposite the relief structure comprises a plane metallization layer and a further glazing ink layer, the color tone of the glazing ink layer and a color tone of the further glazing ink layer being different color tones.

12. A method for manufacturing a disc-shaped pigment with a layer construction, the method comprising:
   a) supplying a carrier substrate;
   b) applying an embossing lacquer onto the carrier substrate;
   c) embossing a relief structure into the embossing lacquer;
   d) providing the relief structure with a reflection-increasing coating;
   e) processing and crushing an obtained layer construction into individual disc-shaped pigments;
      wherein the reflection-increasing coating is a metallization which is covered by a glazing ink layer and the embossing lacquer is dyed in a color tone which is identical to a color tone of the glazing ink layer.

13. The method according to claim 12, wherein in step e), before the step of crushing of the obtained layer construction into individual disc-shaped pigments, the method further comprising first detaching the carrier substrate from the coated embossing lacquer.

* * * * *